US012671806B2

(12) United States Patent (10) Patent No.: US 12,671,806 B2
Chang et al. (45) Date of Patent: Jun. 30, 2026

(54) DECODER DERIVED CROSS COMPONENT PREDICTION IN VIDEO CODING

(71) Applicant: QUALCOMM Incorporated, San Diego, CA (US)

(72) Inventors: Yao-Jen Chang, San Diego, CA (US); Po-Han Lin, Taipei (TW); Vadim Seregin, San Diego, CA (US); Jian-Liang Lin, Su'ao Township (TW); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/891,043

(22) Filed: Sep. 20, 2024

(65) Prior Publication Data

US 2025/0119536 A1 Apr. 10, 2025

Related U.S. Application Data

(60) Provisional application No. 63/643,295, filed on May 6, 2024, provisional application No. 63/619,613, filed
(Continued)

(51) Int. Cl.
H04N 19/186 (2014.01)
H04N 19/11 (2014.01)
(Continued)

(52) U.S. Cl.
CPC ........... H04N 19/11 (2014.11); H04N 19/156 (2014.11); H04N 19/159 (2014.11);
(Continued)

(58) Field of Classification Search
CPC ...... H04N 19/11; H04N 19/70; H04N 19/156; H04N 19/159; H04N 19/174; H04N 19/176; H04N 19/186; H04N 19/593
(Continued)

(56) References Cited

U.S. PATENT DOCUMENTS

2018/0205946 A1 7/2018 Zhang et al.
2024/0187576 A1* 6/2024 Wang ................... H04N 19/154
(Continued)

FOREIGN PATENT DOCUMENTS

WO 2023016439 A1 2/2023

OTHER PUBLICATIONS

Chang (Qualcomm) Y-J., et al., "Non-EE2: Decoder Derived Cross-Component Prediction," JVET-AF0176-v1, 32. JVET Meeting, Oct. 13, 2023-Oct. 20, 2023, Hannover, (The Joint Video Exploration Team of ISO/IEC JTC1/SC29/WG11 and ITU-T SG.16), No. JVET-AF0176, Oct. 6, 2023, pp. 1-3, XP030312332.
(Continued)

*Primary Examiner* — Albert Kir
(74) *Attorney, Agent, or Firm* — Shumaker & Sieffert, P.A.

(57) ABSTRACT

A video decoder may be configured to receive a first instance of a flag for a first block, with a first value for the flag indicating that a cross-component prediction (CCP) mode is derived without signaling and a second value for the flag indicating that the CCP mode is signaled; in response to determining that the first instance of the flag is set to the first value, derive a first CCP mode for the first block; determine a first predicted chroma block for the first block using the first CCP mode; determine a decoded version of the first block based on the first predicted chroma block; and output a picture of decoded video data that includes the decoded version of the first block.

30 Claims, 10 Drawing Sheets

Related U.S. Application Data on Jan. 10, 2024, provisional application No. 63/605,286, filed on Dec. 1, 2023, provisional application No. 63/588,567, filed on Oct. 6, 2023.

(51) Int. Cl.

| | |
|---|---|
| *H04N 19/156* | (2014.01) |
| *H04N 19/159* | (2014.01) |
| *H04N 19/174* | (2014.01) |
| *H04N 19/176* | (2014.01) |
| *H04N 19/593* | (2014.01) |
| *H04N 19/70* | (2014.01) |

(52) U.S. Cl.
CPC ......... *H04N 19/174* (2014.11); *H04N 19/176* (2014.11); *H04N 19/186* (2014.11); *H04N 19/593* (2014.11); *H04N 19/70* (2014.11)

(58) Field of Classification Search
USPC ................................................... 375/240.12
See application file for complete search history.

(56) References Cited

U.S. PATENT DOCUMENTS

| | | | | |
|---|---|---|---|---|
| 2025/0119536 A1* | 4/2025 | Chang | .................. | H04N 19/174 |
| 2025/0150605 A1* | 5/2025 | Kim | ........................ | H04N 19/96 |
| 2025/0337940 A1* | 10/2025 | Zhang | .................. | H04N 19/132 |
| 2025/0373790 A1* | 12/2025 | Yang | .................... | H04N 19/119 |

OTHER PUBLICATIONS

Chang Y-J., et al., "EE2-1.1: Decoder Derived Cross-Component Prediction," JVET-AG0154-v2, Joint Video Experts Team (JVET) of ITU-T SG 16 WP 3 and ISO/IEC JTC 1/SC 29, 33rd Meeting, by teleconference, Jan. 17-26, 2024, pp. 1-3.

Coban M., et al., "Algorithm Description of Enhanced Compression Model 10 (ECM 10)," JVET-AE2025, JVET-AE2025-v1, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.

Coban M., et al., "Algorithm Description of Enhanced Compression Model 11 (ECM 11)," JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.

Deng (Bytedance) Z., et al., "EE2-1.3: Local-Boosting Cross-Component Prediction," JVET-AD0120-v1, 30. JVET Meeting, Apr. 21, 2023-Apr. 28, 2023, Antalya, (The Joint Video Exploration Team of ISO/IEC JTC1/SC29/WG11 and ITU-T SG.16 ), No. JVET-AD0120, m62758, Apr. 15, 2023, pp. 1-4, XP030308769.

International Search Report and Written Opinion—PCT/US2024/047964—ISA/EPO—Dec. 16, 2024 13 Pages.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Karczewicz M., et al., "Common Test Conditions and Evaluation Procedures for Enhanced Compression Tool Testing," JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.

Karczewicz M., et al., "Common Test Conditions and Evaluation Procedures for Enhanced Compression Tool Testing," JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.

* cited by examiner

130

150

152

142

144

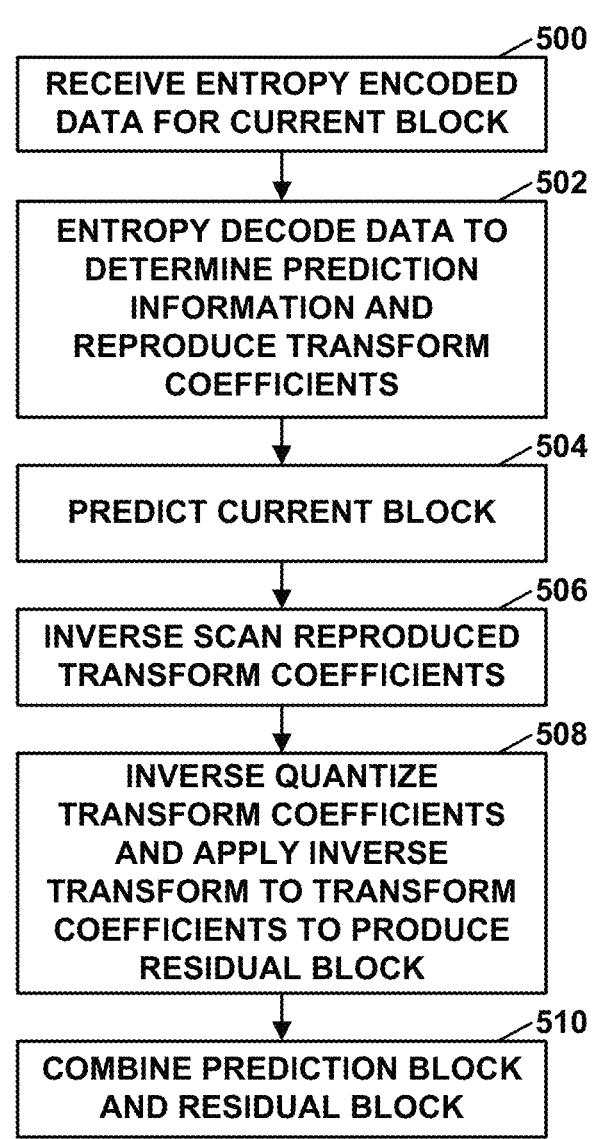

RECEIVE ENTROPY ENCODED
DATA FOR CURRENT BLOCK
_500

ENTROPY DECODE DATA TO
DETERMINE PREDICTION
INFORMATION AND
REPRODUCE TRANSFORM
COEFFICIENTS
_502

PREDICT CURRENT BLOCK
_504

INVERSE SCAN REPRODUCED
TRANSFORM COEFFICIENTS
_506

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK
_508

COMBINE PREDICTION BLOCK
AND RESIDUAL BLOCK
_510

FIG. 8

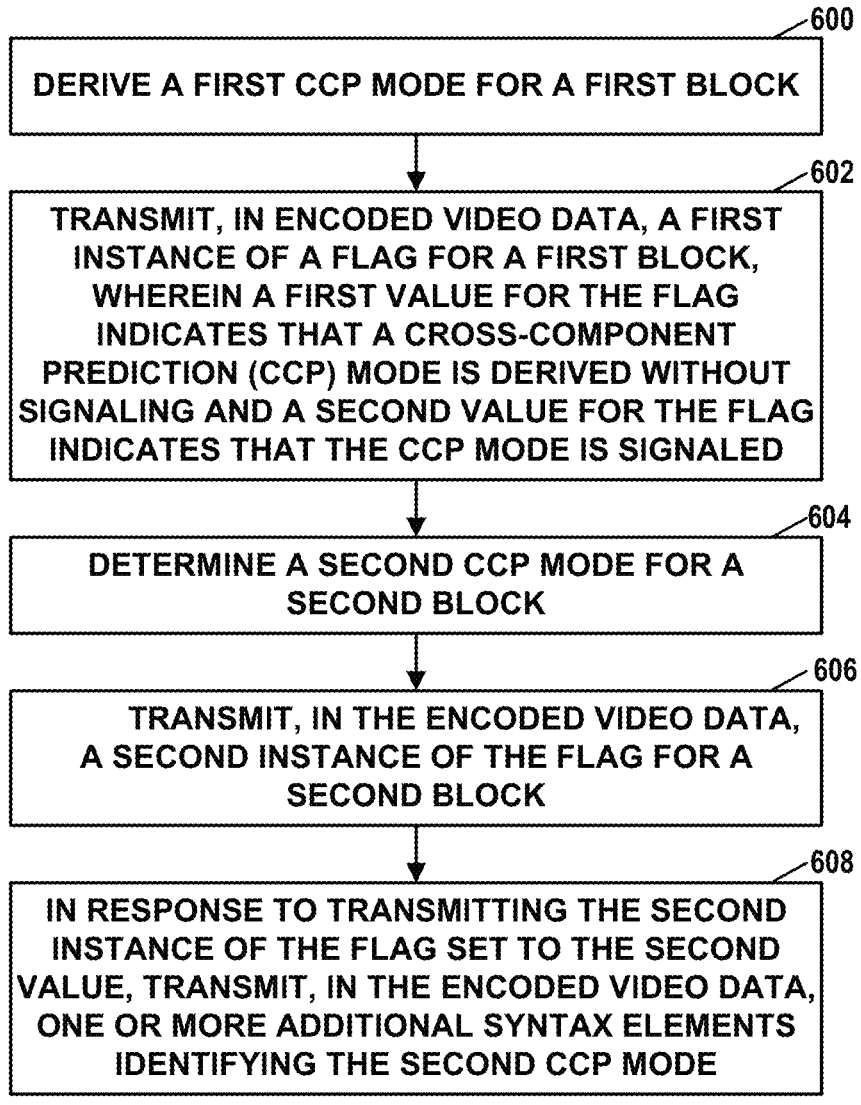

600

DERIVE A FIRST CCP MODE FOR A FIRST BLOCK

602

TRANSMIT, IN ENCODED VIDEO DATA, A FIRST INSTANCE OF A FLAG FOR A FIRST BLOCK, WHEREIN A FIRST VALUE FOR THE FLAG INDICATES THAT A CROSS-COMPONENT PREDICTION (CCP) MODE IS DERIVED WITHOUT SIGNALING AND A SECOND VALUE FOR THE FLAG INDICATES THAT THE CCP MODE IS SIGNALED

604

DETERMINE A SECOND CCP MODE FOR A SECOND BLOCK

606

TRANSMIT, IN THE ENCODED VIDEO DATA, A SECOND INSTANCE OF THE FLAG FOR A SECOND BLOCK

608

IN RESPONSE TO TRANSMITTING THE SECOND INSTANCE OF THE FLAG SET TO THE SECOND VALUE, TRANSMIT, IN THE ENCODED VIDEO DATA, ONE OR MORE ADDITIONAL SYNTAX ELEMENTS IDENTIFYING THE SECOND CCP MODE

FIG. 9

DECODER DERIVED CROSS COMPONENT PREDICTION IN VIDEO CODING

This application claims the benefit of:

U.S. Provisional Patent Application No. 63/643,295, filed 6 May 2024;

U.S. Provisional Patent Application No. 63/619,613, filed 10 Jan. 2024;

U.S. Provisional Patent Application No. 63/605,286, filed 1 Dec. 2023; and

U.S. Provisional Patent Application No. 63/588,567, filed 6 Oct. 2023, the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to prediction and, more specifically, to cross-component prediction (CCP) modes and signaling for those modes. When coding a block in a CCP mode, a video decoder predicts samples for one component, such as a chroma component, based on samples of a different component, such as a luma component. As will be explained in more detail below, there are several CCP modes, which implement CCP in different manners. For a block coded in a CCP mode, signaling which specific CCP mode is used for the block can require a series of flags, which creates a significant signaling overhead for CCP mode coded blocks.

This disclosure describes techniques for deriving, without explicit signaling, which CCP mode to use for a block of video data, which reduces signaling overhead, without significantly increasing distortion caused by lossy encoding. A video decoder may be configured to determine prediction values for a group of chroma samples using a plurality of different CCP modes. The video decoder may then determine amounts of difference for the plurality of different CCP modes by comparing respective prediction values of the chroma samples resulting from the respective CCP mode to the actual values for the chroma samples to determine a respective amount of difference between the respective prediction values and the actual values. Based on the amounts of difference between the respective prediction values and the actual values, the video decoder may select a CCP mode. By selecting a CCP mode in this manner, a video decoder configured according to the techniques of this disclosure may reduce the signaling overhead associated with CCP modes.

According to one technique of this disclosure, a video decoder may be configured to receive a flag, with a first value for the flag indicating that a CCP mode is derived without signaling and a second value for the flag indicating that the CCP mode is signaled. By using such a flag, the overall signaling overhead associated with CCP modes may be reduced while still maintaining the flexibility to use any of the different CCP modes for any particular block.

According to an example of this disclosure, a method of decoding video data includes receiving a first instance of a flag for a first block, wherein a first value for the flag indicates that a cross-component prediction (CCP) mode is derived without signaling and a second value for the flag indicates that the CCP mode is signaled; in response to determining that the first instance of the flag is set to the first value, deriving a first CCP mode for the first block; determining a first predicted chroma block for the first block using the first CCP mode; receiving a second instance of the flag for a second block; in response to determining that the second instance of the flag is set to the second value, receiving additional signaling; determining a second CCP mode for the second block based on the additional signaling; determining a second predicted chroma block for the second block using the second CCP mode; determining a decoded version of the first block based on the first predicted chroma block; determining a decoded version of the second block based on the second predicted chroma block; and outputting one or more pictures of decoded video data, wherein the decoded video data includes the decoded version of the first block and the decoded version of the second block.

According to an example of this disclosure, a device for decoding video data includes a memory configured to store video data and one or more processors implemented in circuitry and configured to: receive a first instance of a flag for a first block, wherein a first value for the flag indicates that a cross-component prediction (CCP) mode is derived without signaling and a second value for the flag indicates that the CCP mode is signaled; in response to determining that the first instance of the flag is set to the first value, derive a first CCP mode for the first block; determine a first predicted chroma block for the first block using the first CCP mode; receive a second instance of the flag for a second block; in response to determining that the second instance of the flag is set to the second value, receive additional signaling; determine a second CCP mode for the second block based on the additional signaling; determine a second predicted chroma block for the second block using the second CCP mode; determine a decoded version of the first block based on the first predicted chroma block; determine a decoded version of the second block based on the second predicted chroma block; and output one or more pictures of decoded video data, wherein the decoded video data includes the decoded version of the first block and the decoded version of the second block.

According to an example of this disclosure, a method of encoding video data includes deriving a first CCP mode for a first block; transmitting, in encoded video data, a first instance of a flag for a first block, wherein a first value for the flag indicates that a cross-component prediction (CCP) mode is derived without signaling and a second value for the flag indicates that the CCP mode is signaled; determining a second CCP mode for a second block; transmitting, in the encoded video data, a second instance of the flag for a second block; and in response to transmitting the second instance of the flag set to the second value, transmitting, in the encoded video data, one or more additional syntax elements identifying the second CCP mode.

According to an example of this disclosure, a device for encoding video data includes a memory configured to store video data and one or more processors implemented in circuitry and configured to: derive a first CCP mode for a first block; transmit, in encoded video data, a first instance of a flag for a first block, wherein a first value for the flag indicates that a cross-component prediction (CCP) mode is derived without signaling and a second value for the flag indicates that the CCP mode is signaled; determine a second CCP mode for a second block; transmit, in the encoded video data, a second instance of the flag for a second block; and in response to transmitting the second instance of the flag set to the second value, transmit, in the encoded video data, one or more additional syntax elements identifying the second CCP mode.

The details of one or more examples are set forth in the accompanying drawings and the description below. Other features, objects, and advantages will be apparent from the description, drawings, and claims.

BRIEF DESCRIPTION OF DRAWINGS

FIG. 8 is a flowchart illustrating an example process for decoding a current block in accordance with the techniques of this disclosure.

FIG. 9 is a flowchart illustrating an example process for encoding a current block in accordance with the techniques of this disclosure.

DETAILED DESCRIPTION

Figure 1:
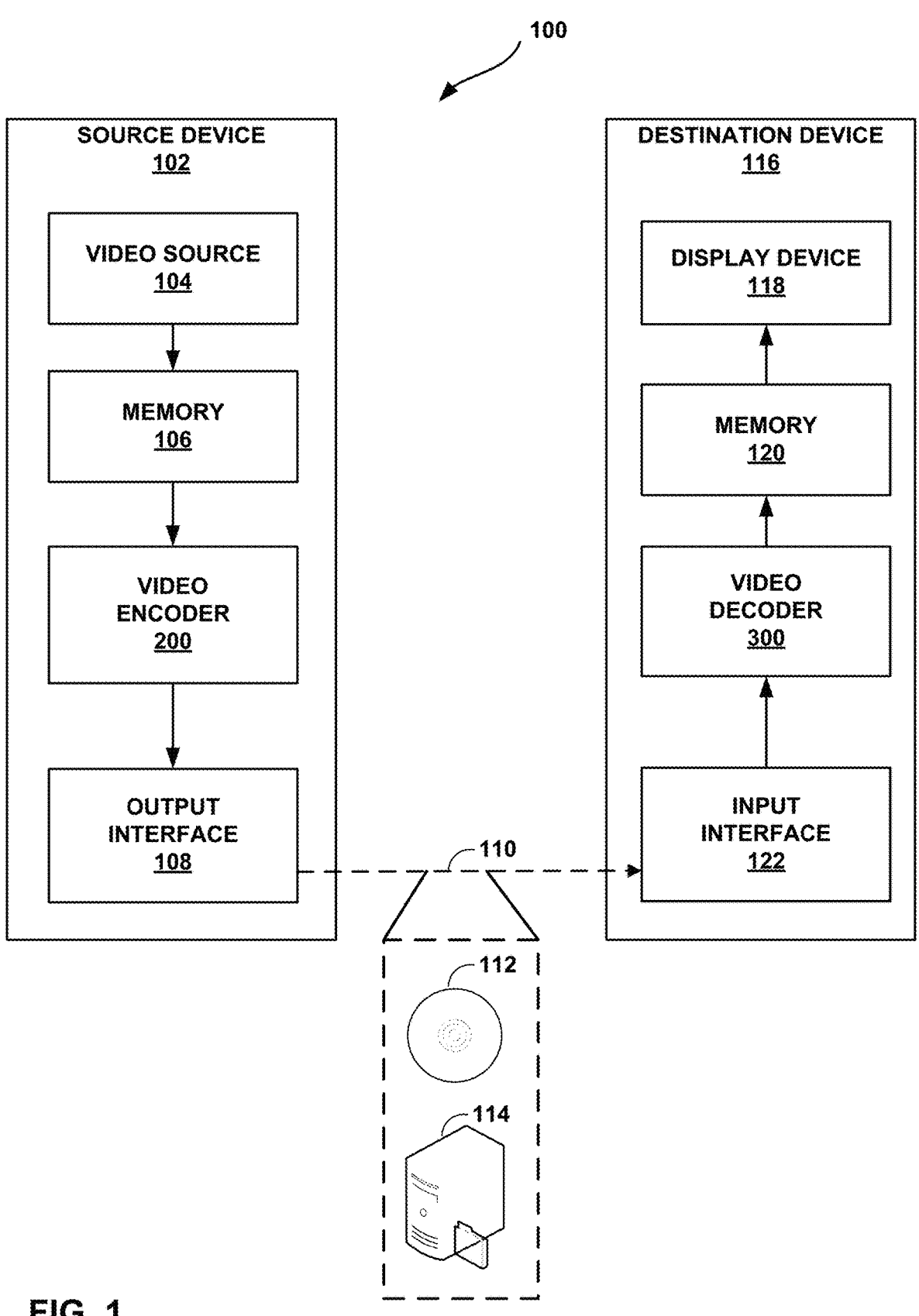
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

The techniques of this disclosure relate to prediction and, more specifically, to cross-component prediction (CCP) modes and signaling for those modes. When coding a block in a CCP mode, a video decoder predicts samples for one component, such as a chroma component, based on samples of a different component, such as a luma component. As will be explained in more detail below, there are several CCP modes, which implement CCP in different manners. For a block coded in a CCP mode, signaling which specific CCP mode is used for the block can require a series of flags, which creates a significant signaling overhead for CCP mode coded blocks.

This disclosure describes techniques for deriving, without explicit signaling, which CCP mode to use for a block of video data, which reduces signaling overhead, without significantly increasing distortion caused by lossy encoding. A video decoder may be configured to determine prediction values for a group of chroma samples using a plurality of different CCP modes. The video decoder may then determine amounts of difference for the plurality of different CCP modes by comparing respective prediction values of the chroma samples resulting from the respective CCP mode to the actual values for the chroma samples to determine a respective amount of difference between the respective prediction values and the actual values. Based on the amounts of difference between the respective prediction values and the actual values, the video decoder may select a CCP mode. By selecting a CCP mode in this manner, a video decoder configured according to the techniques of this disclosure may reduce the signaling overhead associated with CCP modes.

According to one technique of this disclosure, a video decoder may be configured to receive a flag, with a first value for the flag indicating that a CCP mode is derived without signaling and a second value for the flag indicating that the CCP mode is signaled. By using such a flag, the overall signaling overhead associated with CCP modes may be reduced while still maintaining the flexibility to use any of the different CCP modes for any particular block.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding (also called reconstruction) as part of the processes of determining how to encode video data. For example, a video encoder may perform deblocking filtering on decoded video blocks in order to determine whether a certain encoding scheme produces a desirable rate-distortion tradeoff and also so that the video encoder can perform motion estimation using the same blocks available to a video decoder when the video decoder performs motion compensation.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for CCP signaling and derivation described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the described techniques for CCP signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use CCP modes.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In April 2021, JVET began developing an Enhanced Compression Model (ECM) software, see M. Coban, R.-L. Liao, K. Naser, J. Ström, and L. Zhang, "Algorithm description of Enhanced Compression Model 10 (ECM 10)," JVET-AE2025, October 2023, to enhance compression capability beyond VVC. The set of coding tools in the ECM software encompasses all functional blocks in the hybrid video coding framework, including intra prediction, inter prediction, transform and coefficient coding, in-loop filtering, and entropy coding. The techniques of this disclosure may be applied to ECM or other state of the art video codecs/formats such as VVC, AV1, etc.

Cross-component linear model (CCLM) prediction mode is used in VVC. CCLM generally includes predicting chroma samples based on the reconstructed luma samples of the same CU. ECM further adopts various types of CCP modes, which include slope adjustment of CCLM, gradient linear model LM (GLM), convolutional cross-component intra prediction mode (CCCM), no-subsampled CCCM, CCCM with multiple downsampling filters (CCCMwMDF), gradient and location based CCCM (GLCCCM), block-vector guided CCCM (BVG-CCCM), local-boosting CCP (LB-CCP), and CCP merge (CCPmerge, which is also called non-local CCP) mode. For some CCP modes, video decoder 300 may utilize different types of templates (top-only, left-only, and top-and-left) for the model derivation, while for other CCP modes, video decoder 300 may only utilize top-and-left templates for model derivation. For some CCP modes, video decoder 300 may determine how many models are used in a CU (either single-model or multi-model), and for some CCP modes, video decoder 300 may only use a single-model or only multi-model for prediction.

In summary, there are 71 CCP candidate modes if not including slope adjustment CCP and over 6000 CCP candidate modes if slope adjustment CCP is included. CCPmerge (also referred to as NLCCP) utilizes twelve CCP candidates, and the models come from the stored CCP models in neighboring blocks. CCLM utilizes 6 CCP candidates, and each CCP candidate may have a different pair of templates (top-only, left-only, and top-and-left) and number of models (single model and multi-model). CCCM, no-subsampled CCCM, CCCMwMDF, GLCCCM, BVG-CCCM utilize 38 CCP candidates. BVG-CCCM always uses a top-and-left template and multi-model, so video decoder 300 may bypass LBCCP_Flag and set as 0 if Tyep_index is not equal to 1. Because Multi-model is not allowed in GLM, video decoder 300 may bypass GLM_Flag and set as zero if Tyep_index is equal to 1, 4 or 5.

TABLE 1

Figure 2:
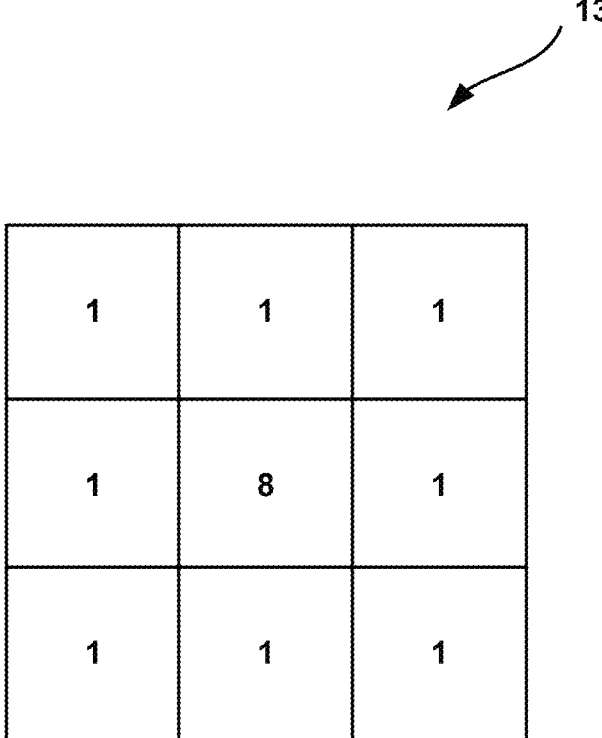
FIG. 2 shows an example of a low pass filter that may be used for local-boosting cross component prediction (CCP).

```
Signal CCPMerge_Flag
if (CCPMerge_Flag == true): signal CCPMerge_Index
else
{
    Signal Type_index
    // to decide which template (top-only, left-only, and top-and-left) is used and
either single-model or multi-model is used as follows:
    Tyep_index = 0: single model and top-and-left template
    Tyep_index = 1: multi-model and top-and-left template
    Tyep_index = 2: single model and left-only template
    Tyep_index = 3: single model and top-only template
    Tyep_index = 4: multi-model and left-only template
    Tyep_index = 5: multi-model and top-only template
        Signal BVG_CCCM_Flag
        if (BVG_CCCM_Flag == false)
        {
            Signal CCCM_Flag
            if (CCCM_Flag == true): signal CCCM_Index
        // to decide which cccm mode is used among regular CCCM, no-subsampled
CCCM, CCCMwMDF, GLCCCM
            else
            {
                Signal GLM_Flag
                if (GLM_Flag == true): signal GLM_Index
                else
                {
                    signal Slope_Adjustment_Flag
                    if (Slope_Adjustment_Flag == true): signal delta_index for each model
to decide which values of delta are applied to the different models in Cb and Cr
                }
            }
            Signal LBCCP_Flag
        }
    }
}
``` template while others can have template selection between top-only, left-only, and top-and-left. Either single model or multi-model can be selected in these modes. LB-CCP utilizes 7 CCP candidates with a low-pass filter (e.g., filter 130 in in FIG. 2) for every predictor generated by a CCP mode, which forces the decoder to choose a top-and-left template and multi-model. LB-CCP may be applied to CCLM, CCCM, no-subsampled CCCM, CCCMwMDF, and GLCCCM. GLM utilizes 8 CCP candidates without multi-model.

Slope adjustment for CCLM utilizes 6640 CCP candidates. Slope adjustment applies a delta to a CCLM weight, where delta could have 9 optional values (e.g., −4/8, −3/8, −2/8, −1/8, 0, 1/8, 2/8, 3/8, and 4/8). The delta may have different values in Cb and Cr. If multi-model is used, the delta can have different values in two models. It is applied to single model CCLM using top-and-left template and multi-model CCLM (MMLM) using top-and-left template. There are 80 delta combinations in single-model CCLM and 6560 combinations in MMLM.

This vast number of CCP candidates requires a significant signaling overhead. The current signaling order for CCP modes is described in Table 1 below, where bold words indicate there is either a flag or index value to be signaled from encoder to decoder. Note that some flags may be bypassed dependent on the value of Tyep_index. For examples, BVG-CCCM and Slope adjustment for CCLM always use top-and-left template, so BVG_CCCM_Flag and Slope_Adjustment_Flag may be bypassed and set to be zero if Tyep_index>1. LBCCP is forced to choose top-and-left In ECM, there are multiple high level syntax flags to control CCP related coding tools. These flags may include a CCCM enabled flag, a CCP merge enabled flag, a CCLM enabled flag, and an LBCCP enabled flag at a high level parameter set, such as SPS, PPS, etc.

The newly-introduced CCP modes improve coding performance overall, especially in chroma performance. However, the current CCP design causes an inefficient signaling when the best CCP mode for a chroma CU in a specific case is the one using the most bits. This disclosure describes techniques to resolve the issue by signaling a decoder derived flag before the CCP signaling to derive a best CCP mode using a probe template for this specific case. This flag is a short-cut in a spirit for the derived CCP mode.

This disclosure describes techniques for a decoder side prediction process, which may be indicated by a flag. In one example, the flag is signaled before all CCP signaling (such as before CCPMerge_Flag). In one example, the flag is signaled before a local CCP signaling (such as before CCCM_Flag). When this DDCCP flag is true, video decoder 300 derives a best CCP mode by using a probe template to calculate the template costs for all CCP candidates evaluated. In some examples, the probe template can be composed of the neighboring blocks adjacent to the current chroma CU. In some examples, the probe template can be composed of other neighboring blocks not adjacent to the current chroma CU.

Figure 3A:
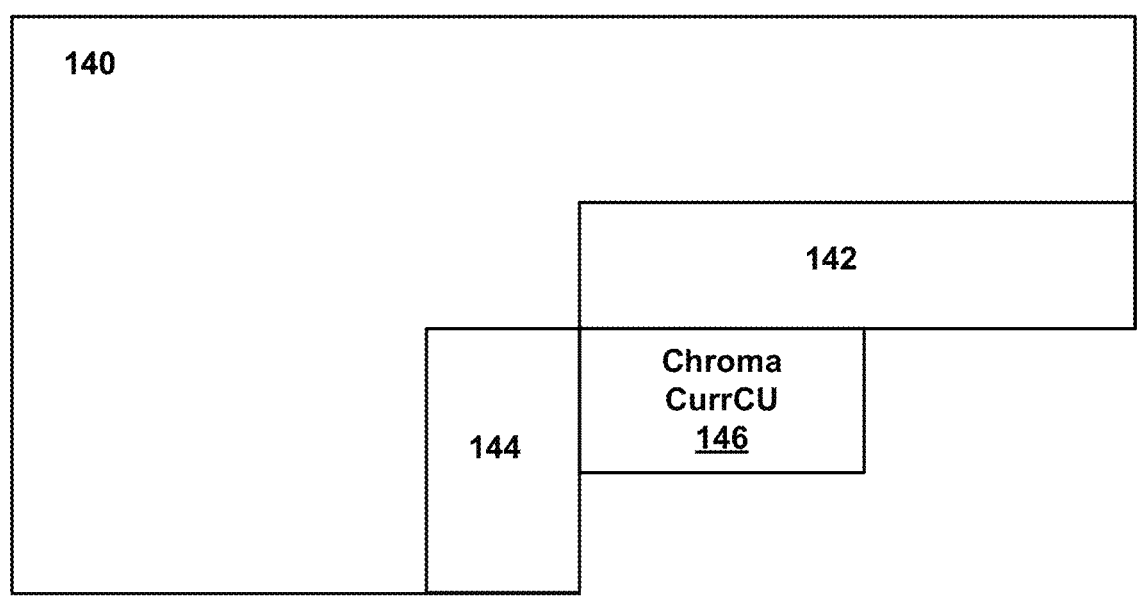
FIGS. 3A and 3B show examples of templates that may be used for decoder-side CCP derivation.
Figure 3B:
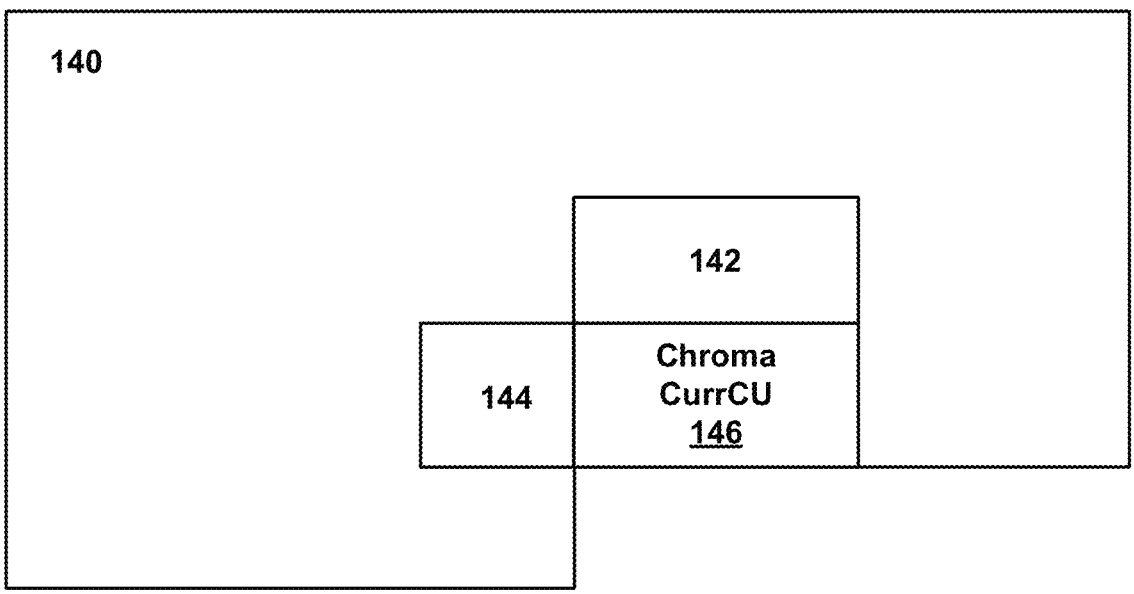

FIGS. 3A and 3B show examples of probe templates composed of the areas of 140, 142, and 144, which are adjacent to the current chroma CU 146. Template 142 and template 144, for example, may form the probe template as shown in FIGS. 3A and 3B. The probe template may have a 1-pixel width. In some examples, the width may be larger than 1 pixel.

In one example, the template cost is calculated by summing up the absolute value of the difference between the reconstructed sample in the probe template and the prediction value generated by the evaluated CCP mode. In some other examples, the template cost can be calculated by other measurements, such SATD cost, mean squared errors, etc. To generate the prediction value, video decoder 300 derives the CCP model. In some examples, video decoder 300 may use the chroma samples and collocated luma samples in areas 140, 142, and 144 to derive the CCP model. In some examples, video decoder 300 may use the samples in area 140 only (excluding probe template) to derive the model. After all CCP modes are evaluated by template cost, the CCP mode with lowest cost is selected. The CCP mode selected may use templates in areas 140, 142, and 144 to derive the model, and use the derived model to generate the predictors for a current chroma CU. In some examples, the CCP mode selected may use a template in area 140 only (the same as template during CCP mode derivation) to derive the model, and use the derived model to generate the predictors in current chroma CU. In some examples, the CCP mode selected may use the same template as used during CCP mode derivation to derive the model for prediction generation. The latter can reduce the complexity to avoid model derivation twice.

In some examples, the CCP modes using one type of template process for model derivation cannot be evaluated by probe template costs with the CCP modes using another type of template processes. Using different templates may cause outliers and noise during cost evaluation. In one example, the CCP modes using top-and-left template for model derivation cannot be evaluated by probe template costs with the CCP modes using top-only template or left-only template.

In some examples, if the CCP modes uses one type of template processes for model derivation, then the probe template is constrained to be the same template type for cost calculation. In one example, if the CCP modes use top-and-left template for model derivation, then the probe template is constrained to use top-and-left (i.e., areas 142 and 144 in FIGS. 3A and 3B) for cost calculation. In another example, if the CCP modes uses top-only template for model derivation, then the probe template is constrained to being top-only (i.e., area 142 in FIGS. 3A and 3B) for a cost calculation. Similarly, if the CCP modes uses a left-only template for model derivation, then the probe template is constrained to being left-only (i.e., area 144 in FIGS. 3A and 3B) for a cost calculation.

The techniques of this disclosure may be applied to cross-components chroma prediction modes, or any other coding tools using LM, CCCM technologies, for examples: InterCCCM, LIC, and intraTMP prediction fusions.

Video decoder 300 may be configured to perform decoder-derived CCP. The DDCCP flag can be signaled at different places. In some examples, the DDCCP flag can be a general flag signaled before all CCP modes. In some examples, the DDCCP flag can be a local flag signaled before a specific type of CCP mode is signaled. In some examples, several DDCCP flags are coexisted in different places to derive different types of CCP modes.

One example for the general flag is the DDCCP flag to be signaled before CCPMerge_Flag. If DDCCP flag is true, then video decoder 300 derives a CCP mode from a CCP mode list. The CCP mode list may be composed of any CCP mode. In some examples, these modes can be CCPMerge, regular CCCM mode, CCCMwMDF, GLCCCM, CCLM, LBCCP applied to modes from CCPMerge, LBCCP applied to CCCM mode, LBCCP applied to CCCMwMDF, and LBCCP applied to GLCCCM, etc., where the mode could be single-model or multi-model.

One example for the local flag is to signal a local DDCCP flag before CCCM-related modes (such as CCCM mode, CCCMwMDF, GLCCCM), i.e., CCCM_Flag. If this local DDCCP flag is true, then video decoder 300 may derive a CCP mode from a CCP mode list. The CCP mode list could be composed of any CCCM-related mode. In one example, the modes are regular CCCM mode, CCCMwMDF, GLCCCM, etc.

Another example for the local flag is to signal a local DDCCP flag before delta is signaled for slope adjustment. If this DDCCP flag is true, then video decoder 300 may derive a delta value from a CCP mode list. The CCP mode list could be composed of any CCP mode applied with different delta values.

The CCP lists may be different between the list for general DDCCP flag and the lists for local DDCCP flags.

In some examples, video decoder 300 may derive more than one CCP mode to generate a list, reorder the list based on a matching cost, and receive an index signaling which CCP candidate in the list is to be used for decoding a block of video data. Video decoder 300 may derive more than one CCCM-related mode (such as regular CCCM mode, CCCMwMDF modes, GLCCCM mode), and reorder the list to on average use fewer bits CCM mode signaling by assigning the most likely CCM candidates to indexes with fewer bits.

In some examples, there may be one indicator (maybe a high-level flag or a slice-level signaling) to decide a CCP mode list. In one example, there may be two lists, one is the CCP list for natural content, and another is the CCP list for screen content. The list for screen content could include the CCP modes which are effective in screen content, such as GLM, no-subsampled CCCM, BVG-CCCM, etc. The other list does not include these CCP modes which are not effective in natural content.

In one example, the CCP list construction is controlled by multiple high level flags. The CCP mode list could include different types of CCP modes. The type of CCP mode may be controlled by a high level enabled flag at a high level parameter set. In one example, if the high level enabled flag is false, this type of CCP mode is not allowed to be added into the proposed CCP list. In one example, if the CCLM enabled flag signaled at the SPS is false, CCLM related modes are not allowed to be added into the list during CCP list construction. In another example, if the LBCCP enabled flag signaled at the SPS is false, LBCCP related modes are not allowed to be added into the proposed CCP list.

Figure 4:
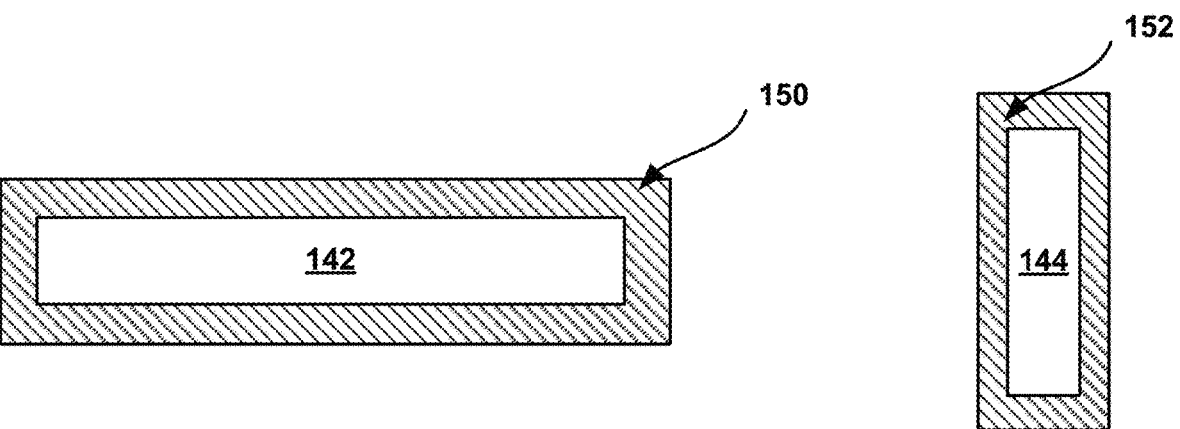
FIG. 4 shows an example of a low pass filter that may be used for CCP.

If LBCCP applied CCP modes are included in the list, then video decoder 300 obtains CCP predictors 150 and 152 with 1-pixel width around the probe templates for areas 142 and 144, as shown in FIG. 4, so that the predictors in probe templates can be processed with a low-pass filter. If the predictors outside the probe template are not available by CCP, for example, if the pixel location is outside the picture, then those values are padded from the nearest CCP predictors in the templates for areas 142 and 144.

Video decoder 300 may be configured to determine decoder-derived CCP fusions. According to the techniques of this disclosure, video decoder 300 may use the costs calculated above for decoder-derived CCP to decide whether to enable a CCP fusion process. In some examples, video decoder 300 selects N CCP modes with lowest costs, and then fuses these N CCP modes, where N is a preassigned positive value. In some examples, the number of N is derived by comparing the costs with the lowest cost, denoted as lowestCost. If there are M CCP modes among N CCP modes are lower than (Tc*lowestCost), where Tc>1 is a preassigned value, then these M CCP modes are fused together. In the case of N=2, if the cost of 2nd CCP mode is smaller than (Tc*lowestCost), where lowestCost is the cost of 1st CCP mode with lowest template cost, then 2 CCP modes are fused together. Otherwise, no fusion is used. In some examples, the ratio may be a fixed ratio, such as 3:1 relative to CCP with lower template cost, and relative to CCP with higher template cost if two CCP candidates are fused.

In some examples, a fusion mode may be used as an extra CCP candidate for decoder-derived CCP, and video decoder 300 may calculate the costs by the same probe template to derive which mode among non-fusion modes and fusion modes is selected for current CU. Examples of fusion modes as extra CCP candidates are as follows: Suppose CCP mode list includes {single-model CCCM, single-model CCCM applied with LBCCP, multi-model CCCM, multi-model CCCM applied with LBCCP, single-model GLCCCM, single-model CCCM derived from CCPMerge, multi-model CCCM derived from CCPMerge, applying LBCCP to multi-model CCCM derived from CCPMerge, single-model GLCCCM derived from CCPMerge, multi-model GLCCCM derived from CCPMerge}. Suppose two CCP candidates are fused as an extra candidate. Different fusion modes combined from any two CCP candidates from the CCP list may be added into the list. If a DDCCP flag is true, then non-fusion modes and fusion modes may be evaluated based on template costs. The mode (either non-fusion mode or fusion mode) with the lowest cost may be selected for current CU.

In some examples, video decoder 300 may generate a separate CCP fusion list from the lists described above for decoder-derived CCP, and this separate list is composed of different fusion candidates. In one example, the fusion candidates are the fusion of any two of CCP candidates modes, the fusion of any three of CCP modes, and so on. The best fusion mode is selected based on the probe template cost, where a predictor in the template B and C is generated from the fusion of the CCP modes applied with weighting factors. In some examples, the fusion index in the CCP fusion list is signaled to decide which fusion process is used.

A ratio between CCP predictors for fusion may be a fixed and pre-assigned value. In some examples, video decoder 300 may use costs to derive the ratio. Take N=2 as example: Predictor after fusion is denoted as P=w1*CCP1+w2*CCP2, where CCP1 is predictors derived from first CCP with lowest cost Cost1, and CCP2 is predictors derived from second CCP with second lowest cost Cost2. Then w1=Cost2/(Cost1+Cost2), and then w2=Cost1/(Cost1+Cost2).

The fusion processes described herein may be applied to the general DDCCP flag and/or a local DDCCP flags processes discussed above with respect to decoder-derived CCP.

According to techniques of this disclosure, two components may have different decoder derived modes. In other words, if a DDCCP flag is true, a Cb component and Cr component may have separately derived, decoder derived modes from the same CCP list. In some examples, fusion modes may be added into the CCP list as extra CCP candidates, and then Cb and Cr may have different fusion modes. In some examples, one component may use a fusion mode, and another component may use a non-fusion mode. In some examples, two components may have different non-fusion modes.

This disclosure also describe techniques for decoder complexity reduction. CU size is used as a constraint to decide whether to enable DDCCP and/or a specific type of CCP modes to reduce the complexity. In some examples, if CU size smaller than a pre-assigned value Ta, e.g., w+h<Ta (w and h are chroma CU width and height) or w*h<Ta, then DDCCP flag is bypassed for signaling. In some examples, if CU size smaller than a pre-assigned value Tb, e.g., w+h<Tb (w and h are chroma CU width and height), then one specific CCP mode (such as the multi-model CCP modes, or GLCCCM mode, etc.) may not be included in the CCP mode list. Tb is larger than or equal to Ta. In some examples, the value Ta or Tb is explicitly signaled into the bitstream. In some examples, the value Ta or Tb is adaptively determined based on the statistics of previous coding blocks.

In some examples, a skipping process is proposed to early terminate a specific type of CCP modes. In one example, video decoder 300 may first calculate the probe template costs of all single model CCP modes, and a best cost (denoted as bestCost) is stored. When the cost of a specific type of CCP mode using single-model is smaller than (threshold*bestCost), where threshold >=1, then video decoder 300 may skip the same type of CCP mode using multi-model. In one example, if the cost of regular CCCM mode using single model is smaller than (threshold*bestCost), then video decoder 300 may skip the regular CCCM mode using multi-model.

In other examples, a skipping process is proposed to terminate early specific types of CCP modes by comparing the cost with the sum of CU width and CU height. In one example, the lowest cost among non-fusion modes being smaller than half of the sum of CU width and CU height may indicate the cost of a non-fusion mode is small enough, and this CU does not need to enable fusion candidates, which may require more complicated operations. Therefore, in such a case, the adding fusion of candidates into the CPP mode list may be skipped. In some examples, the lowest cost among non-fusion modes being equal to zero may indicate that non-fusion candidate can already provide a perfect prediction on template, and therefore fusion candidates do not need to be added into the CCP list.

This disclosure also described techniques for having separate DDCCP lists in different slices. For example, the CCP lists may be different between I slices and non-I slices. Two slices may apply different rules to generate the CCP lists. One example is for an I slice, video encoder 200 and video decoder 300 may add GLCCCM candidates into the list when w*h<Tc, where Tc is a preassigned constant, such as 32, and for non-I slices may add GLCCCM candidates into the list without any CU size constraint. The design concept is an I slice needs more constraints while adding candidates into a CCP list in order to not increase complexity for I slices. However, non-I slices can allow less constraints while adding candidates into CCP list because adding more candidates usually does not impact the complexity for non-I slices.

Figure 5:
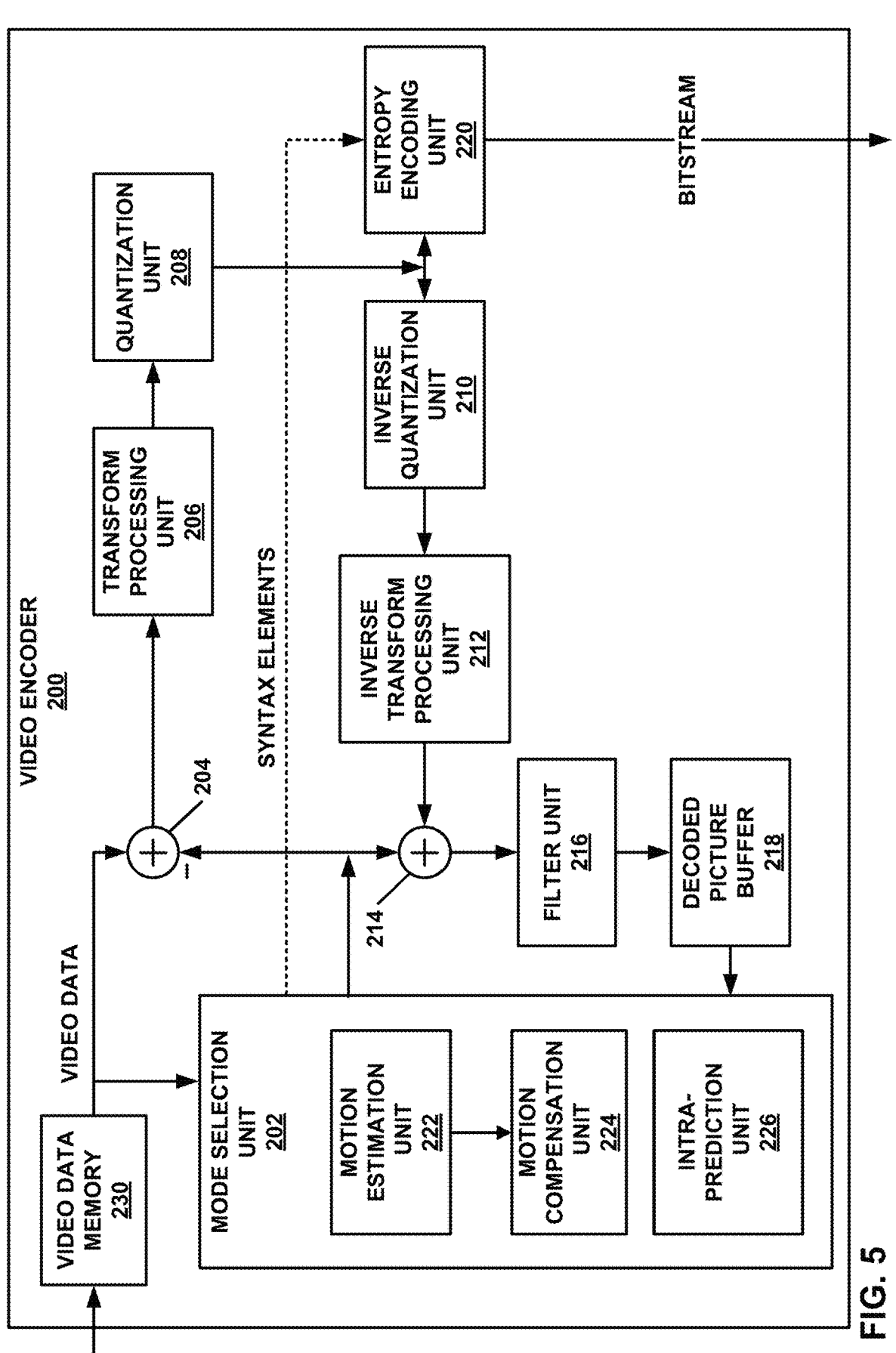
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a CCP mode for a block of video data and determine whether to set a flag for a block to a first value for the flag indicating that a CCP mode is derived without signaling or a second value for the flag that indicates that the CCP mode is signaled.

Figure 6:
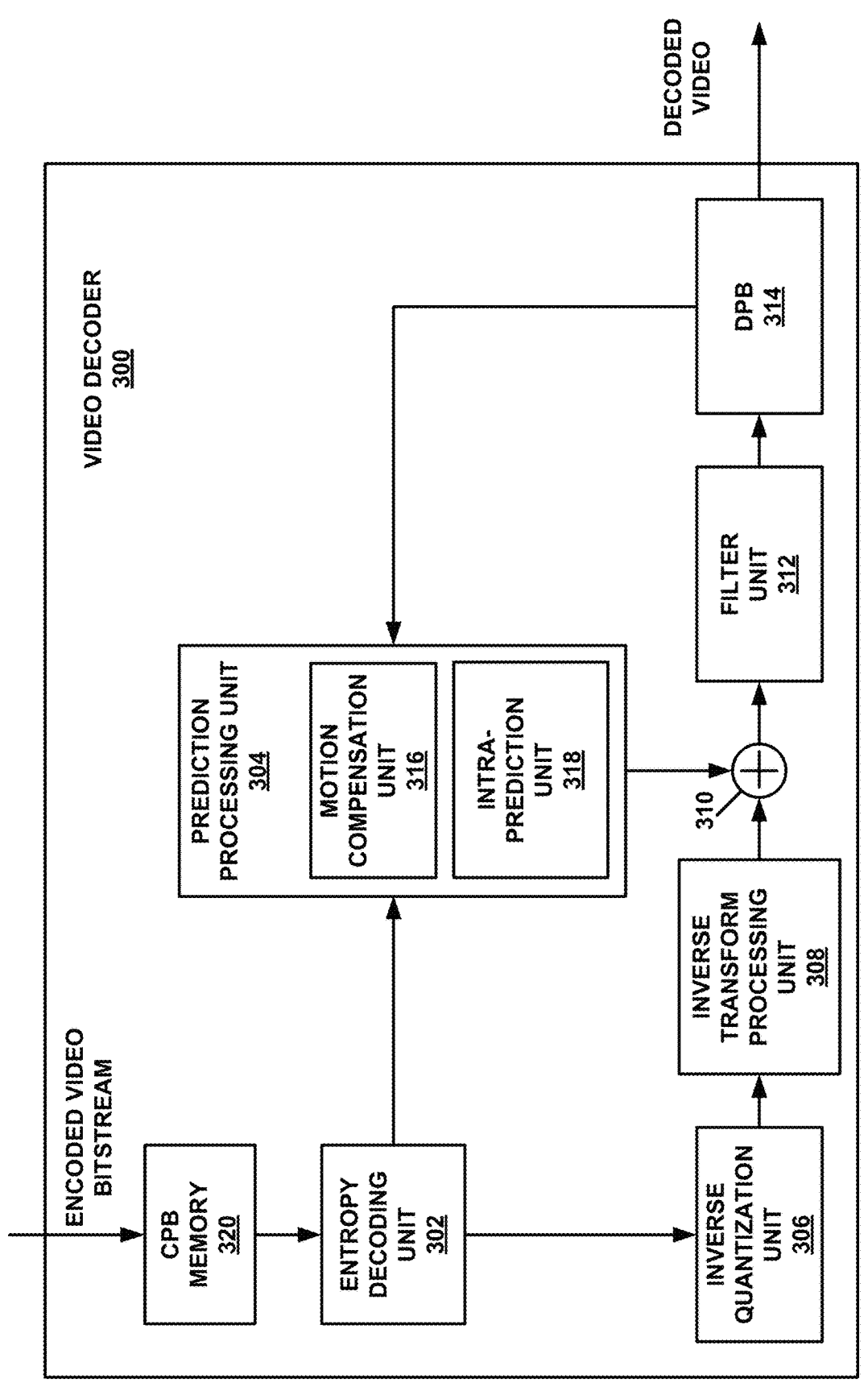
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive a first instance of flag for a first block, wherein a first value for the flag indicates that a CCP mode is derived without signaling and a second value for the flag indicates that the CCP mode is signaled; in response to determining that the first instance of the flag is set to the first value, derive a first CCP mode for the first block; determine a first predicted chroma block for the first block using the first CCP mode; receive a second instance of the flag for a second block; in response to determining that the second instance of the flag is set to the second value, receive additional signaling; determine a second CCP mode for the second block based on the additional signaling; and determine a second predicted chroma block for the second block using the second CCP mode.

Figure 7:
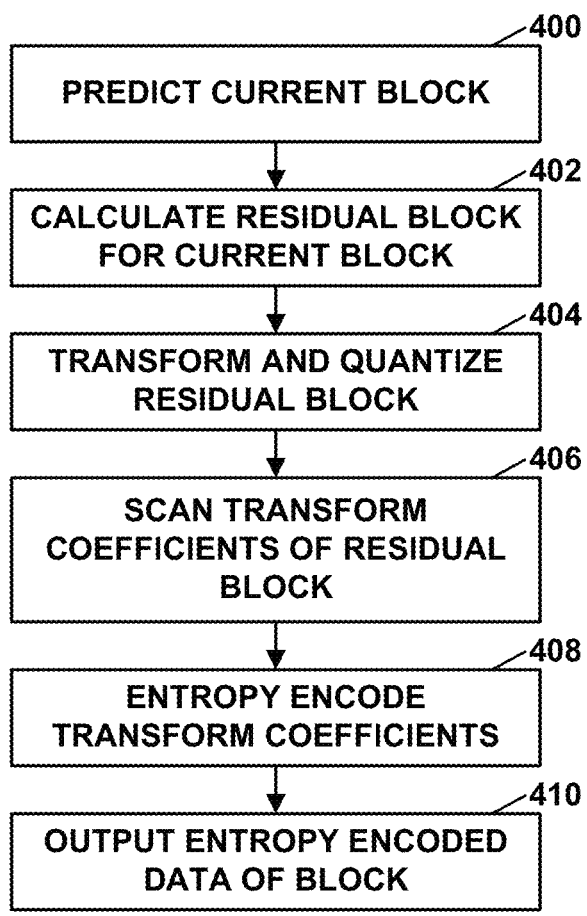
FIG. 7 is a flowchart illustrating an example process for encoding a current block in accordance with the techniques of this disclosure.

FIG. 7 is a flowchart illustrating an example process for encoding a current block in accordance with the techniques of this disclosure. The current block may be or include a current CU. Although described with respect to video encoder 200 (FIGS. 1 and 5), it should be understood that other devices may be configured to perform a process similar to that of FIG. 7.

In this example, video encoder 200 initially predicts the current block (400). For example, video encoder 200 may form a prediction block for the current block. Video encoder

200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 8 is a flowchart illustrating an example process for decoding a current block of video data in accordance with the techniques of this disclosure. The current block may be or include a current CU. Although described with respect to video decoder 300 (FIGS. 1 and 6), it should be understood that other devices may be configured to perform a process similar to that of FIG. 8.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

FIG. 9 is a flowchart illustrating an example process for encoding a current block in accordance with the techniques of this disclosure. The current block may be or include a current CU. Although described with respect to video encoder 200 (FIGS. 1 and 5), it should be understood that other devices may be configured to perform a process similar to that of FIG. 9.

In the example of FIG. 9, video encoder 200 derives a first CCP mode for a first block (600). To derive the first CCP mode for the first block, video encoder 200 may be configured to determine a list of candidate CCP modes and select the first CCP mode from the list of candidate CCP modes. To derive the first CCP mode for the first block, video encoder 200 may additionally be configured to determine template costs for the candidate CCP modes and select the first CCP mode from the list of candidate CCP modes based on the template costs. Video encoder 200 may, for example, determine the list of candidate CCP modes based on a slice type of a slice that includes the first block.

Video encoder 200 transmits, in encoded video data, a first instance of a flag for a first block, wherein a first value for the flag indicates that a cross-component prediction (CCP) mode is derived without signaling and a second value for the flag indicates that the CCP mode is signaled (602). The flag may, for example, be a block-level flag.

Video encoder 200 determines a second CCP mode for a second block (604). Video encoder 200 transmits, in the encoded video data, a second instance of the flag for a second block (606). In response to transmitting the second instance of the flag set to the second value, video encoder 200 transmits, in the encoded video data, one or more additional syntax elements identifying the second CCP mode (608). The one or more additional syntax elements may, for example, include any of the various syntax elements shown above in Table 1.

Figure 10:
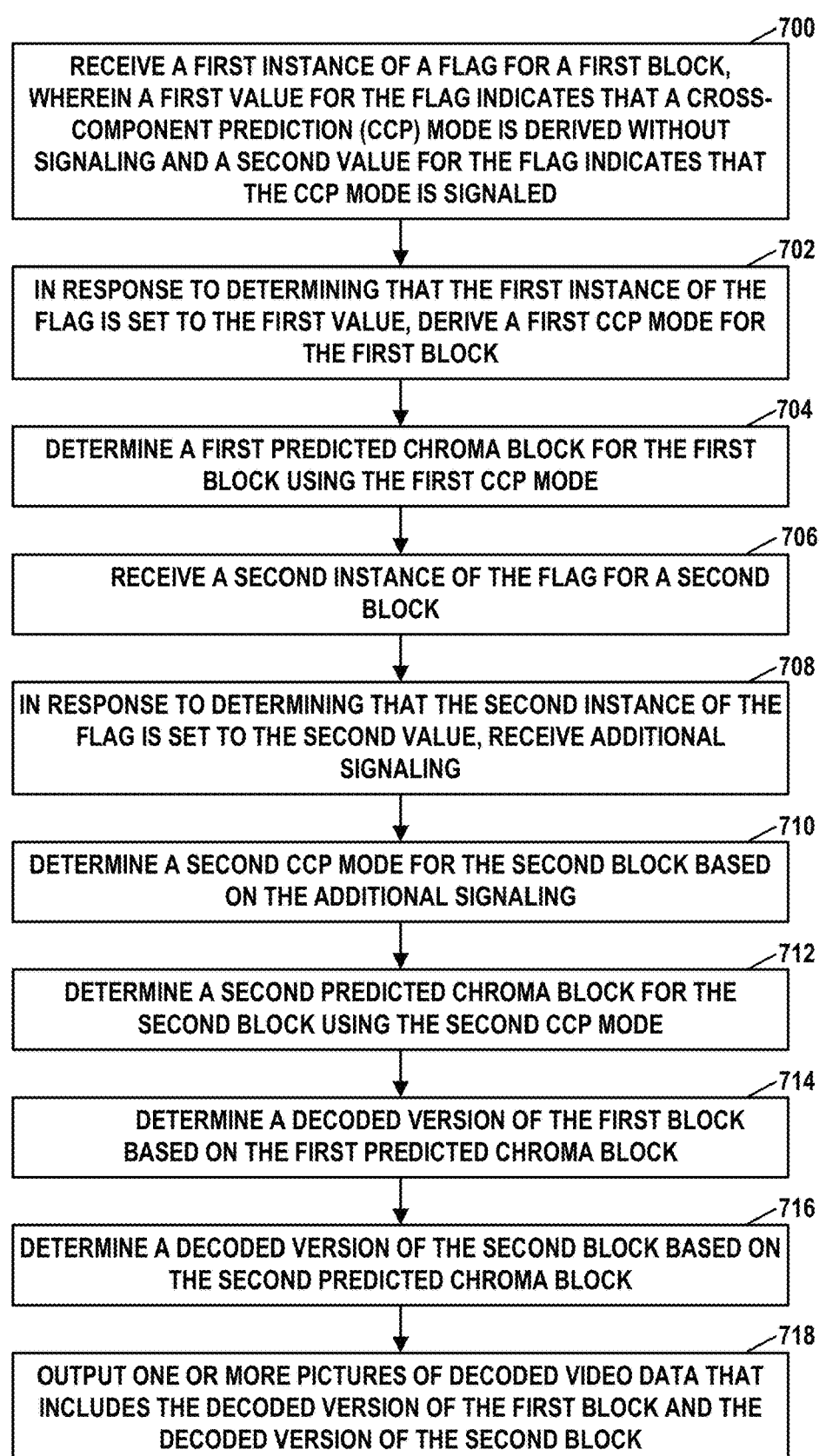
FIG. 10 is a flowchart illustrating an example process for decoding a current block in accordance with the techniques of this disclosure.

FIG. 10 is a flowchart illustrating an example process for decoding a current block of video data in accordance with the techniques of this disclosure. The current block may be or include a current CU. Although described with respect to video decoder 300 (FIGS. 1 and 6), it should be understood that other devices may be configured to perform a process similar to that of FIG. 10.

In the example of FIG. 10, video decoder 300 receives a first instance of a flag for a first block, with a first value for the flag indicating that a CCP mode is derived without signaling and a second value for the flag indicating that the CCP mode is signaled (700). The flag may, for example, be a block level flag.

In response to determining that the first instance of the flag is set to the first value, video decoder 300 derive a first CCP mode for the first block (702). To derive the first CCP mode for the first block, video decoder 300 may be configured to determine a list of candidate CCP modes and select the first CCP mode from the list of candidate CCP modes. The list may include any combination or permutation of the various CCP modes described herein. Video decoder 300 may, for example, determine template costs for the candidate CCP modes and select the first CCP mode from the list of candidate CCP modes based on the template costs. Video decoder 300 may, for example, determine the list of candidate CCP modes based on a slice type of a slice that includes the first block. Video decoder 300 determines a first predicted chroma block for the first block using the first CCP mode (704).

Video decoder 300 receives a second instance of the flag for a second block (706). In response to determining that the second instance of the flag is set to the second value, video decoder 300 receives additional signaling (708). Video decoder 300 determines a second CCP mode for the second block based on the additional signaling (710). The additional signaling may, for example, include any of the various syntax elements shown above in Table 1.

Video decoder 300 determines a second predicted chroma block for the second block using the second CCP mode (712). Video decoder 300 determines a decoded version of the first block based on the first predicted chroma block (714). Video decoder 300 determines a decoded version of the second block based on the second predicted chroma block (716).

Video decoder 300 outputs one or more pictures of decoded video data, wherein the decoded video data includes the decoded version of the first block and the decoded version of the second block (718). Video decoder 300 may, for example, output the one or more pictures for display, transmission, or storage. Video decoder 300 may use stored copies of the one or more pictures for decoding future pictures of the video data.

The following numbered clauses illustrate one or more aspects of the devices and techniques described in this disclosure.

Clause 1A: A method of decoding video data, the method comprising: receiving a first instance of flag for a first block, wherein a first value for the flag indicates that a cross-component prediction (CCP) mode is derived without signaling and a second value for the flag indicates that the CCP mode is signaled; in response to determining that the first instance of the flag is set to the first value, deriving a first CCP mode for the first block; determining a first predicted chroma block for the first block using the first CCP mode; receiving a second instance of the flag for a second block; in response to determining that the second instance of the flag is set to the second value, receiving additional signaling; determining a second CCP mode for the second block based on the additional signaling; and determining a second predicted chroma block for the second block using the second CCP mode.

Clause 2A: The method of clause 1A, wherein deriving the first CCP mode for the first block comprises: determining template costs for a plurality of CCP modes; and selecting one of the plurality of CCP modes as the first CCP mode based on the template costs.

Clause 3A: The method of clause 1A or 2A, wherein one or both of the first CCP mode and the second CCP mode comprise a fusion mode.

Clause 4A: A device for coding video data, the device comprising one or more means for performing the method of any of clauses 1A-3A.

Clause 5A: The device of clause 4A, wherein the one or more means comprise one or more processors implemented in circuitry.

Clause 6A: The device of any of clauses 4A and 5A, further comprising a memory to store the video data.

Clause 7A: The device of any of clauses 4A-6A, further comprising a display configured to display decoded video data.

Clause 8A: The device of any of clauses 4A-6A, wherein the device comprises one or more of a camera, a computer, a mobile device, a broadcast receiver device, or a set-top box.

Clause 9A: The device of any of clauses 4A-8A, wherein the device comprises a video decoder.

Clause 10A: A computer-readable storage medium having stored thereon instructions that, when executed, cause one or more processors to perform the method of any of clauses 1A-3A.

Clause 11A: A device for decoding video data, the device comprising: means for receiving a first instance of flag for a first block, wherein a first value for the flag indicates that a cross-component prediction (CCP) mode is derived without signaling and a second value for the flag indicates that the CCP mode is signaled; means for deriving a first CCP mode for the first block in response to determining that the first instance of the flag is set to the first value; means for determining a first predicted chroma block for the first block using the first CCP mode; means for receiving a second instance of the flag for a second block; means for receiving additional signaling in response to determining that the second instance of the flag is set to the second value; means for determining a second CCP mode for the second block based on the additional signaling; and means for determining a second predicted chroma block for the second block using the second CCP mode.

Clause 12A: The device of clause 11A, wherein the means for deriving the first CCP mode for the first block comprises: means for determining template costs for a plurality of CCP modes; and means for selecting one of the plurality of CCP modes as the first CCP mode based on the template costs.

Clause 13A: The device of clause 11A or 12A, wherein one or both of the first CCP mode and the second CCP mode comprise a fusion mode.

Clause 1B: A method of decoding video data, the method comprising: receiving a first instance of a flag for a first block, wherein a first value for the flag indicates that a cross-component prediction (CCP) mode is derived without signaling and a second value for the flag indicates that the CCP mode is signaled; in response to determining that the first instance of the flag is set to the first value, deriving a first CCP mode for the first block; determining a first predicted chroma block for the first block using the first CCP mode; receiving a second instance of the flag for a second block; in response to determining that the second instance of the flag is set to the second value, receiving additional signaling; determining a second CCP mode for the second block based on the additional signaling; determining a second predicted chroma block for the second block using the second CCP mode; determining a decoded version of the first block based on the first predicted chroma block; determining a decoded version of the second block based on the second predicted chroma block; and outputting one or more pictures of decoded video data, wherein the decoded video data includes the decoded version of the first block and the decoded version of the second block.

Clause 2B: The method of clause 1B, wherein deriving the first CCP mode for the first block comprises: determining a list of candidate CCP modes; and selecting the first CCP mode from the list of candidate CCP modes.

Clause 3B: The method of clause 2B, wherein deriving the first CCP mode for the first block further comprises: determining template costs for the candidate CCP modes; and selecting the first CCP mode from the list of candidate CCP modes based on the template costs.

Clause 4B: The method of clause 2B or 3B, further comprising: determining the list of candidate CCP modes based on a slice type of a slice that includes the first block.

Clause 5B: The method of any of clauses 2B-4B, wherein the list of candidate CCP modes includes a first candidate CCP mode that utilizes a top-and-left template and a second candidate CCP mode that utilizes one of a left-only template or a top-only template.

Clause 6B: The method of any of clauses 2B-5B, wherein the list of candidate CCP modes includes a cross-component linear model prediction mode and a cross-component intra prediction mode.

Clause 7B: The method of any of clauses 2B-6B, further comprising: adding one or more fusion modes to the list of candidate CCP modes based on a size of the first block.

Clause 8B: The method of any of clauses 1B-7B, wherein one or both of the first CCP mode and the second CCP mode comprise a fusion mode.

Clause 9B: The method of any of clauses 1B-8B, wherein the flag comprises a block-level flag.

Clause 10B: A device for decoding video data, the device comprising: a memory configured to store video data; one or more processors implemented in circuitry and configured to: receive a first instance of a flag for a first block, wherein a first value for the flag indicates that a cross-component prediction (CCP) mode is derived without signaling and a second value for the flag indicates that the CCP mode is signaled; in response to determining that the first instance of the flag is set to the first value, derive a first CCP mode for the first block; determine a first predicted chroma block for the first block using the first CCP mode; receive a second instance of the flag for a second block; in response to determining that the second instance of the flag is set to the second value, receive additional signaling; determine a second CCP mode for the second block based on the additional signaling; determine a second predicted chroma block for the second block using the second CCP mode; determine a decoded version of the first block based on the first predicted chroma block; determine a decoded version of the second block based on the second predicted chroma block; and output one or more pictures of decoded video data, wherein the decoded video data includes the decoded version of the first block and the decoded version of the second block.

Clause 11B: The device of clause 10B, wherein to derive the first CCP mode for the first block, the one or more processors are further configured to: determine a list of candidate CCP modes; and select the first CCP mode from the list of candidate CCP modes.

Clause 12B: The device of clause 11B, wherein to derive the first CCP mode for the first block, the one or more processors are further configured to: determine template costs for the candidate CCP modes; and select the first CCP mode from the list of candidate CCP modes based on the template costs.

Clause 13B: The device of clause 11B or 12B, wherein the one or more processors are further configured to: determine the list of candidate CCP modes based on a slice type of a slice that includes the first block.

Clause 14B: The device of any of clauses 11B-13B, wherein the list of candidate CCP modes includes a first candidate CCP mode that utilizes a top-and-left template and a second candidate CCP mode that utilizes one of a left-only template or a top-only template.

Clause 15B: The device of any of clauses 11B-14B, wherein the list of candidate CCP modes includes a cross-component linear model prediction mode and a cross-component intra prediction mode.

Clause 16B: The device of any of clauses 11B-15B, wherein the one or more processors are further configured to: add one or more fusion modes to the list of candidate CCP modes based on a size of the first block.

Clause 17B: The device of any of clauses 10B-16B, wherein one or both of the first CCP mode and the second CCP mode comprise a fusion mode.

Clause 18B: The device of any of clauses 10B-17B, wherein the flag comprises a block-level flag.

Clause 19B: The device of any of clauses 10B-18B, further comprising a display configured to display the one or more pictures of decoded video data.

Clause 20B: The device of any of clauses 10B-19B, wherein the device comprises one or more of a camera, a computer, a mobile device, a broadcast receiver device, or a set-top box.

Clause 21B: A method of encoding video data, the method comprising: deriving a first CCP mode for a first block; transmitting, in encoded video data, a first instance of a flag for a first block, wherein a first value for the flag indicates that a cross-component prediction (CCP) mode is derived without signaling and a second value for the flag indicates that the CCP mode is signaled; determining a second CCP mode for a second block; transmitting, in the encoded video data, a second instance of the flag for a second block; and in response to transmitting the second instance of the flag set to the second value, transmitting, in the encoded video data, one or more additional syntax elements identifying the second CCP mode.

Clause 22B: The method of clause 21B, wherein deriving the first CCP mode for the first block comprises: determining a list of candidate CCP modes; and selecting the first CCP mode from the list of candidate CCP modes.

Clause 23B: The method of clause 22B, wherein deriving the first CCP mode for the first block further comprises: determining template costs for the candidate CCP modes;

and selecting the first CCP mode from the list of candidate CCP modes based on the template costs.

Clause 24B: The method of clause 22B or 23B, further comprising: determining the list of candidate CCP modes based on a slice type of a slice that includes the first block.

Clause 25B: A device for encoding video data, the device comprising: a memory configured to store video data; one or more processors implemented in circuitry and configured to: derive a first CCP mode for a first block; transmit, in encoded video data, a first instance of a flag for a first block, wherein a first value for the flag indicates that a cross-component prediction (CCP) mode is derived without signaling and a second value for the flag indicates that the CCP mode is signaled; determine a second CCP mode for a second block; transmit, in the encoded video data, a second instance of the flag for a second block; and in response to transmitting the second instance of the flag set to the second value, transmit, in the encoded video data, one or more additional syntax elements identifying the second CCP mode.

Clause 26B: The device of clause 25B, wherein deriving the first CCP mode for the first block comprises: determining a list of candidate CCP modes; and selecting the first CCP mode from the list of candidate CCP modes.

Clause 27B: The device of clause 26B, wherein to derive the first CCP mode for the first block, the one or more processors are further configured to: determine template costs for the candidate CCP modes; and select the first CCP mode from the list of candidate CCP modes based on the template costs.

Clause 28B: The device of clause 26B or 27B, wherein the one or more processors are further configured to: determine the list of candidate CCP modes based on a slice type of a slice that includes the first block.

Clause 29B: The device of any of clauses 25B-28B, wherein the flag comprises a block-level flag.

Clause 30B: The device of any of clauses 25B-29B, further comprising: a camera configured to acquire the video data.

Clause 31B: A method of decoding video data, the method comprising: determining prediction values for a group of chroma samples using a plurality of different cross-component prediction (CCP) modes, wherein the group of chroma samples comprise already decoded chroma samples with actual values; determining amounts of difference for the plurality of different CCP modes, wherein determining the amounts of difference comprises, for each respective CCP mode of the plurality of different CCP modes, comparing respective prediction values of for the chroma samples resulting from the respective CCP mode to the actual values for the chroma samples to determine a respective amount of difference between the respective prediction values and the actual values; selecting a CCP mode from the plurality of different CCP modes based on the amounts of difference; for a current block of the video data, determining a predicted chroma block using the selected CCP mode; determining a decoded version of the current block based on the predicted chroma block; outputting a picture of decoded video data that includes the decoded version of the current block.

Clause 32B: The method of clause 31B, wherein the respective amount of difference between the respective prediction values and the actual values comprises a sum of absolute differences between the respective prediction values and the actual values.

Clause 33B: The method of clause 31 wherein determining the prediction values for the group of chroma samples using the plurality of different CCP modes comprises determining the prediction values for the group of chroma samples using the plurality of different CCP modes in response to a flag being set to a first value, wherein the first value for the flag indicates that the CCP mode for the block is derived without signaling and a second value for the flag indicates that the CCP mode for the block is signaled.

Clause 34B: The method of clause 33B, wherein the flag comprises a block-level flag.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving a first instance of a flag for a first block, wherein a first value for the flag indicates that a cross-component prediction (CCP) mode is derived without signaling of the CCP mode and a second value for the flag indicates that the CCP mode is signaled;

in response to determining that the first instance of the flag is set to the first value, deriving a first CCP mode for the first block;

determining a first predicted chroma block for the first block using the first CCP mode;

receiving a second instance of the flag for a second block;

in response to determining that the second instance of the flag is set to the second value, receiving additional signaling;

determining a second CCP mode for the second block based on the additional signaling identifying the second CCP mode;

determining a second predicted chroma block for the second block using the second CCP mode;

determining a decoded version of the first block based on the first predicted chroma block;

determining a decoded version of the second block based on the second predicted chroma block; and outputting one or more pictures of decoded video data, wherein the decoded video data includes the decoded version of the first block and the decoded version of the second block.

2. The method of claim 1, wherein deriving the first CCP mode for the first block comprises:

determining a list of candidate CCP modes; and selecting the first CCP mode from the list of candidate CCP modes.

3. The method of claim 2, wherein deriving the first CCP mode for the first block further comprises:

determining template costs for the candidate CCP modes; and selecting the first CCP mode from the list of candidate CCP modes based on the template costs.

4. The method of claim 2, further comprising:

determining the list of candidate CCP modes based on a slice type of a slice that includes the first block.

5. The method of claim 2, wherein the list of candidate CCP modes includes a first candidate CCP mode that utilizes a top-and-left template and a second candidate CCP mode that utilizes one of a left-only template or a top-only template.

6. The method of claim 2, wherein the list of candidate CCP modes includes a cross-component linear model prediction mode and a cross-component intra prediction mode.

7. The method of claim 2, further comprising:

adding one or more fusion modes to the list of candidate CCP modes based on a size of the first block.

8. The method of claim 1, wherein one or both of the first CCP mode and the second CCP mode comprise a fusion mode.

9. The method of claim 1, wherein the flag comprises a block-level flag.

10. A device for decoding video data, the device comprising: a memory configured to store video data; and one or more processors implemented in circuitry and configured to:

receive a first instance of a flag for a first block, wherein a first value for the flag indicates that a cross-component prediction (CCP) mode is derived without signaling of the CCP mode and a second value for the flag indicates that the CCP mode is signaled;

in response to determining that the first instance of the flag is set to the first value, derive a first CCP mode for the first block;

determine a first predicted chroma block for the first block using the first CCP mode;

receive a second instance of the flag for a second block;

in response to determining that the second instance of the flag is set to the second value, receive additional signaling;

determine a second CCP mode for the second block based on the additional signaling identifying the second CCP mode;

determine a second predicted chroma block for the second block using the second CCP mode;

determine a decoded version of the first block based on the first predicted chroma block;

determine a decoded version of the second block based on the second predicted chroma block; and output one or more pictures of decoded video data, wherein the decoded video data includes the decoded version of the first block and the decoded version of the second block.

11. The device of claim 10, wherein to derive the first CCP mode for the first block, the one or more processors are further configured to:

determine a list of candidate CCP modes; and select the first CCP mode from the list of candidate CCP modes.

12. The device of claim 11, wherein to derive the first CCP mode for the first block, the one or more processors are further configured to:

determine template costs for the candidate CCP modes; and select the first CCP mode from the list of candidate CCP modes based on the template costs.

13. The device of claim 11, wherein the one or more processors are further configured to:

determine the list of candidate CCP modes based on a slice type of a slice that includes the first block.

14. The device of claim 11, wherein the list of candidate CCP modes includes a first candidate CCP mode that utilizes a top-and-left template and a second candidate CCP mode that utilizes one of a left-only template or a top-only template.

15. The device of claim 11, wherein the list of candidate CCP modes includes a cross-component linear model prediction mode and a cross-component intra prediction mode.

16. The device of claim 11, wherein the one or more processors are further configured to:

add one or more fusion modes to the list of candidate CCP modes based on a size of the first block.

17. The device of claim 10, wherein one or both of the first CCP mode and the second CCP mode comprise a fusion mode.

18. The device of claim 10, wherein the flag comprises a block-level flag.

19. The device of claim 10, further comprising a display configured to display the one or more pictures of decoded video data.

20. The device of claim 10, wherein the device comprises one or more of a camera, a computer, a mobile device, a broadcast receiver device, or a set-top box.

21. A method of encoding video data, the method comprising:

deriving a first CCP mode for a first block;

transmitting, in encoded video data, a first instance of a flag for a first block, wherein a first value for the flag indicates that a cross-component prediction (CCP) mode is derived without signaling of the CCP mode and a second value for the flag indicates that the CCP mode is signaled;

determining a second CCP mode for a second block;

transmitting, in the encoded video data, a second instance of the flag for a second block; and in response to transmitting the second instance of the flag set to the second value, transmitting, in the encoded video data, one or more additional syntax elements identifying the second CCP mode.

22. The method of claim 21, wherein deriving the first CCP mode for the first block comprises:

determining a list of candidate CCP modes; and selecting the first CCP mode from the list of candidate CCP modes.

23. The method of claim 22, wherein deriving the first CCP mode for the first block further comprises:

determining template costs for the candidate CCP modes; and selecting the first CCP mode from the list of candidate CCP modes based on the template costs.

24. The method of claim 22, further comprising:

determining the list of candidate CCP modes based on a slice type of a slice that includes the first block.

25. A device for encoding video data, the device comprising:

a memory configured to store video data; and one or more processors implemented in circuitry and configured to:

derive a first CCP mode for a first block;

transmit, in encoded video data, a first instance of a flag for a first block, wherein a first value for the flag indicates that a cross-component prediction (CCP) mode is derived without signaling of the CCP mode and a second value for the flag indicates that the CCP mode is signaled;

determine a second CCP mode for a second block;

transmit, in the encoded video data, a second instance of the flag for a second block; and in response to transmitting the second instance of the flag set to the second value, transmit, in the encoded video data, one or more additional syntax elements identifying the second CCP mode.

26. The device of claim 25, wherein deriving the first CCP mode for the first block comprises:

determining a list of candidate CCP modes; and selecting the first CCP mode from the list of candidate CCP modes.

27. The device of claim 26, wherein to derive the first CCP mode for the first block, the one or more processors are further configured to:

determine template costs for the candidate CCP modes; and select the first CCP mode from the list of candidate CCP modes based on the template costs.

28. The device of claim 26, wherein the one or more processors are further configured to:

determine the list of candidate CCP modes based on a slice type of a slice that includes the first block.

29. The device of claim 25, wherein the flag comprises a block-level flag.

30. The device of claim 25, further comprising: a camera configured to acquire the video data.

* * * * *